US012544315B2

(12) United States Patent
Sauceda et al.

(10) Patent No.: US 12,544,315 B2
(45) Date of Patent: Feb. 10, 2026

(54) INFANT FEEDER

(71) Applicant: Fridababy, LLC, Miami, FL (US)

(72) Inventors: Samuel Sauceda, Los Angeles, CA (US); Chelsea Hirschhorn, Miami, FL (US); John Fritz, Buffalo, NY (US)

(73) Assignee: Fridababy, LLC, Miami, FL (US)

( * ) Notice: Subject to any disclaimer, the term of this patent is extended or adjusted under 35 U.S.C. 154(b) by 169 days.

(21) Appl. No.: 18/466,567

(22) Filed: Sep. 13, 2023

(65) Prior Publication Data

US 2025/0082548 A1 Mar. 13, 2025

(51) Int. Cl.

*A61J 11/00* (2006.01)
*A61J 9/08* (2006.01)
*A61J 11/04* (2006.01)

(52) U.S. Cl.

CPC ............. *A61J 11/0035* (2013.01); *A61J 9/08* (2013.01); *A61J 11/045* (2013.01)

(58) Field of Classification Search

CPC ......... A61J 11/0035; A61J 9/08; A61J 11/045
See application file for complete search history.

(56) References Cited

U.S. PATENT DOCUMENTS

| | | | | |
|---|---|---|---|---|
| 2,612,165 A * | 9/1952 | Szuderski | A61J 17/001 606/236 |
| 2,824,561 A | 2/1958 | Mueller | |
| 2,889,829 A * | 6/1959 | Tannenbaum | A61J 7/0053 215/11.1 |
| 3,426,755 A | 2/1969 | Clegg | |
| 4,192,307 A | 3/1980 | Baer | |
| D326,151 S | 5/1992 | Wallace et al. | |
| 5,127,903 A | 7/1992 | Mailot et al. | |
| 5,300,024 A | 4/1994 | Yang | |
| D353,461 S | 12/1994 | Byrd | |
| 5,573,507 A * | 11/1996 | Moser | A47G 21/18 215/11.1 |
| 5,578,004 A | 11/1996 | Liang | |

(Continued)

FOREIGN PATENT DOCUMENTS

| | | |
|---|---|---|
| CA | 2492798 A1 | 7/2006 |
| CN | 103705386 A | 4/2014 |

(Continued)

OTHER PUBLICATIONS

International Search Report and Written Opinion—PCT/US2024/046751—ISA/US—Dec. 2, 2024.

*Primary Examiner* — Tri M Mai
(74) *Attorney, Agent, or Firm* — Seyfarth Shaw LLP

(57) ABSTRACT

An infant feeder has a handle with a proximally extending tongue and a pouch assembly for fitting over the tongue. The tongue has first and second axially spaced apart detenting structures. In a first configuration, a pouch assembly detenting structure is engaged with the first tongue detenting structure. In order to achieve a second configuration, a predetermined axial force is applied to the pouch assembly relative to the handle, so as to disengage the pouch assembly detenting structure from the first tongue detenting structure, slide the pouch assembly distally down a sidewall of the tongue and engage the second tongue detenting structure. This decreases the size of the food volume bounded by the pouch assembly and the tongue, and proximally displaces any food contained therein.

23 Claims, 15 Drawing Sheets

(56) References Cited

U.S. PATENT DOCUMENTS

| | | | |
|---|---|---|---|
| D377,830 | S | 2/1997 | Lai |
| 5,662,684 | A | 9/1997 | Caso |
| 5,711,759 | A | 1/1998 | Smith et al. |
| 5,843,030 | A | 12/1998 | Van Der Merwe |
| 6,139,566 | A | 10/2000 | Bennett |
| D449,381 | S | 10/2001 | de Begon de Larouziere |
| 6,524,272 | B1 | 2/2003 | Berry, Sr. |
| 7,500,984 | B2 | 3/2009 | Fuisz et al. |
| 7,753,886 | B2 | 7/2010 | Vath et al. |
| 7,901,375 | B2 | 3/2011 | Dunn et al. |
| 8,042,493 | B2 | 10/2011 | Jacobs |
| 8,545,439 | B2 | 10/2013 | Lo |
| 8,597,235 | B2 | 12/2013 | Lo |
| D714,950 | S | 10/2014 | Lo |
| D717,117 | S | 11/2014 | Saxton et al. |
| 8,985,357 | B1 | 3/2015 | Strayer et al. |
| D730,697 | S | 6/2015 | Johnson et al. |
| D731,857 | S | 6/2015 | Saxton et al. |
| D736,572 | S | 8/2015 | Trumbo et al. |
| D737,095 | S | 8/2015 | Trumbo et al. |
| D739,539 | S | 9/2015 | Khachikian et al. |
| 9,301,904 | B2 | 4/2016 | Paxson et al. |
| D755,399 | S | 5/2016 | Jones |
| 9,463,143 | B2 * | 10/2016 | Oates, II ............... A61J 15/008 |
| 9,717,656 | B2 * | 8/2017 | Lo .......................... A61J 9/005 |
| 9,730,861 | B2 | 8/2017 | Lo |
| 9,770,394 | B1 | 9/2017 | Velazquez |
| 9,814,654 | B2 | 11/2017 | Saxton |
| D805,647 | S | 12/2017 | Jones et al. |
| 10,426,710 | B2 | 10/2019 | Jones et al. |
| 10,780,025 | B2 | 9/2020 | Oates, II et al. |
| 10,842,719 | B1 | 11/2020 | Picchetti |
| D933,246 | S | 10/2021 | Zhang |
| D939,718 | S | 12/2021 | Zhang |
| D948,929 | S | 4/2022 | Zhang |
| 11,304,876 | B1 | 4/2022 | Zhang |
| D962,454 | S | 8/2022 | Zhang |
| D962,724 | S | 9/2022 | Zhang |
| 11,446,210 | B2 | 9/2022 | Dyk |
| 2007/0021782 | A1 | 1/2007 | Inoue et al. |
| 2008/0177305 | A1 | 7/2008 | Vath et al. |
| 2010/0140204 | A1 | 6/2010 | Vischer |
| 2010/0249751 | A1 | 9/2010 | Agarwal et al. |
| 2012/0022446 | A1 | 1/2012 | Desai et al. |
| 2013/0090595 | A1 | 4/2013 | Brenner |
| 2013/0102997 | A1 | 4/2013 | Abbassmovahedi et al. |
| 2016/0074287 | A1 | 3/2016 | Wang |
| 2016/0213570 | A1 | 7/2016 | Athanassiou |
| 2019/0254933 | A1 | 8/2019 | Lake |
| 2019/0254934 | A1 | 8/2019 | Lake |
| 2022/0387261 | A1 | 12/2022 | Wang |
| 2023/0080026 | A1 | 3/2023 | Gharibian et al. |

FOREIGN PATENT DOCUMENTS

| | | | |
|---|---|---|---|
| CN | 104257506 | A | 1/2015 |
| CN | 206063432 | U | 4/2017 |
| CN | 209033219 | U | 6/2019 |
| CN | 110025491 | A | 7/2019 |
| CN | 211212485 | U | 8/2020 |
| DE | 202004001195 | U1 | 4/2004 |
| GB | 536196 | | 5/1941 |
| WO | 98044892 | A1 | 10/1998 |
| WO | 2012146884 | A1 | 11/2012 |

* cited by examiner

INFANT FEEDER

BACKGROUND OF THE INVENTION

Infant feeders have been developed by which infants may consume a soft food without spoon-feeding the infant. The soft food usually has the characteristics of a viscous fluid and may be put under pressure by various means. The infant, or a caregiver, inserts a bag, sac or pouch into the infant's mouth. This pouch is made of a pliable material, is hollow and has an array of holes in it. The pouch is filled with food, and, once sufficient fluid pressure is placed on the food, the food will begin to extrude through the holes and into the infant's mouth. That fluid pressure may result in part from the infant biting the pouch, and/or imposing a partial vacuum on the food by sucking.

As the feeding continues, the food volume bounded by the pouch sidewall will begin to empty. Various structures have been developed to increase the fluid pressure on the food, thereby displacing the food toward the infant. In U.S. Pat. No. 8,545,439 to Lo and in one embodiment therein, the handle of the feeder is replaced with a food-squeezing unit in fluid communication with the food pouch. The infant uses its hands to squeeze this unit or bulb, increasing fluid pressure on the food contained within the food pouch. US Patent Appln. Pub. No. 2022/0387261 to Wang discloses an infant feeder in which food is displaced by way of a spring-loaded internal elastic member. Further improvements in infant feeders could be made, by which food inside of the pouch may be proximally displaced (toward the infant's mouth) without complicated internal structure and without relying on external forces such as the hands of an infant or caregiver.

SUMMARY OF THE INVENTION

According to one aspect of the invention, an infant feeder comprises a handle that is formed on a proximal-distal axis and which has a base. As used herein, "proximal" means nearer an infant's mouth, and "distal" means farther away from the infant's mouth. The handle has a tongue which extends proximally from the base. A proximal surface of the tongue bounds a food volume of the feeder, wherein the food volume is adapted to be filled with food. The tongue has a sidewall with plural detenting structures, including first and second tongue detenting structures. The second tongue detenting structure is spaced in a distal direction on the tongue sidewall from the first tongue detenting structure. The infant feeder further includes a pouch assembly that in use is disposed on the axis. The pouch assembly includes a pouch, which may be provided by itself or may be one of many such pouches. A sidewall of the pouch is formed of a flexible material and bounds the food volume. A plurality of holes are formed through the pouch sidewall to permit the flow of food therethrough. A pouch assembly detenting structure is formed on a pouch assembly inner surface. In a first configuration of the feeder, the pouch assembly detenting structure is engaged with the first tongue detenting structure. To place the feeder in a second configuration, a predetermined axial force is applied to disengage the pouch assembly detenting structure from the first tongue detenting structure, and to distally displace the pouch assembly relative to the tongue until the pouch assembly detenting structure becomes engaged with the second tongue detenting structure. This decreases the food volume of the feeder.

In one embodiment, the first tongue detenting structure is a first groove formed on the tongue sidewall, and the second tongue detenting structure is a second groove formed on the tongue sidewall to be distally spaced from the first groove. In this embodiment, the pouch assembly detenting structure is a radially inwardly extending bead that is sized to be received by the first groove or the second groove. In one embodiment, these grooves and the bead are endless and extend around the axis.

The food-displacing structure of the invention is usable with tongues that are noncircular in axial cross section. The pouch and tongue may therefore conform to the noncircular infant oral anatomy by being flat ovals. The distal opening in the pouch may be made to be noncircular to aid in filling food into the pouch.

The pouch assembly may be integrally molded of one piece, but in another embodiment the pouch assembly comprises a pouch and a collar that are molded as separate pieces. In the latter embodiment, the collar has a central opening defined by a circumferential inner sidewall of the collar. The pouch has a distal end, an inner surface extending proximally from the distal end, and an outer surface that is opposed to the inner surface and also extends proximally from the distal end. The inner sidewall of the collar fits around the outer surface of the pouch at the pouch distal end. The pouch assembly detenting structure is formed on the inner surface of the pouch. Because they are molded as separate pieces, the polymer compound used to mold the pouch may have different physical characteristics from the polymer compound used to mold the collar, as for example being more yieldable.

In one embodiment, there is provided a kit including the handle, the collar, and a plurality of pouches which differ from each other by one or more characteristics selected from the group consisting of the number of holes in the pouch, the size of the holes and the size of the food volume. In one embodiment, the feeder further includes a cap which may be releasably joined to the pouch so as to fit over the pouch. In one embodiment, a radially outwardly extending pouch flange is formed on the outer surface of the pouch at the distal end of the pouch. A pouch-receiving groove is formed in the inner sidewall of the collar to receive the pouch flange.

In another aspect of the invention, an infant feeder is provided that includes a handle formed on a proximal-distal axis. The handle has a base and a handle portion that distally extends from the base and a tongue that proximally extends from the base. The tongue has a proximal end and a tongue sidewall that distally extends from the proximal end of the tongue. A radially inwardly extending, circumferential first groove is formed on the tongue sidewall. A circumferential sidewall portion of the tongue sidewall distally spaces the first groove from a second groove also formed on the tongue sidewall. The circumferential sidewall portion has a substantially uniform cross section. The feeder further includes a pouch assembly including a pouch and a collar that is releasably joined to the pouch. The pouch has a proximal end and an opposed, open distal end. A sidewall of the pouch is formed of a flexible material and bounds a food volume. A plurality of holes are formed through the pouch sidewall to permit the passage of food therethrough. The pouch has an inner surface. A radially inwardly extending bead is formed on the pouch inner surface to be adjacent the distal end of the pouch. The bead is sized to be received in either the first groove or the second groove. In a first configuration of the feeder, the bead is disposed in the first groove. In order to place the feeder in a second configuration, a predetermined axial force is exerted on the collar relative to the handle, thereby dislodging the collar flange from the first groove, axially sliding the collar flange in a distal direction along the circumferential sidewall portion of the tongue sidewall until the second tongue groove is met, and snapping the bead into the second groove. This decreases the food volume and proximally displaces any food inside the food volume while in the first configuration toward the proximal end of the pouch.

In one embodiment, a radially outwardly extending pouch flange is formed on the outer surface of the pouch sidewall near the distal end of the pouch. A collar groove is formed on the inner sidewall of the collar to receive the pouch flange.

In one embodiment, there is provided a kit including the handle, the collar and a plurality of pouches that include at least first, second and third pouches. The second and third pouches differ from the first pouch and from each other by one or more characteristics selected from the group consisting of a number of the holes in the pouch, the size of the holes and the size of the food volume.

In one embodiment, the infant feeder further comprises a cap that is frictionally engaged with the pouch assembly to cover the pouch. The cap may be used in storing a feeder filled with food, and is removed prior to giving the feeder to an infant.

In one embodiment, the base has a proximal surface. A distal surface of the collar mates with the proximal surface of the base when the infant feeder is in the second configuration.

According to another aspect of the invention, an infant feeder comprises a handle that is formed on a proximal-distal axis and which has a base. A tongue of the handle proximally extends from the base and has a proximal end. An axially circumferential tongue sidewall distally extends from the proximal end of the tongue to the base. A first tongue detenting structure is formed on the tongue sidewall. A second tongue detenting structure is formed on the tongue sidewall to be distally spaced from the first tongue detenting structure. A pouch assembly is disposed on the axis and includes a pouch with a proximal end. A pouch sidewall, formed of a flexible material, bounds a food volume adapted to be filled with food. A plurality of holes are formed in the pouch sidewall to permit the flow of food therethrough. The pouch assembly has a proximal portion adjacent the proximal end of the pouch and a distal portion extending from the proximal portion. An inner surface of the pouch assembly has a proximal portion, a distal portion, a pouch shutoff surface between the proximal and distal portions, and a pouch assembly detenting structure. The proximal portion of the inner surface of the pouch assembly distally extends from the proximal end of the pouch assembly to the pouch shutoff surface. The distal portion of the inner surface of the pouch assembly distally extends from the pouch shutoff surface to the pouch assembly detenting structure, and has a substantially uniform axial cross section. An axially orthogonal radius to the distal portion of the pouch assembly inner surface, taken in any particular axial plane, is substantially the same as an axially orthogonal largest radius taken in that plane to the tongue shutoff surface. But an axially orthogonal radius to a point on the proximal portion of the pouch assembly inner surface proximal from but near the pouch shutoff surface, taken in that plane, is less than said largest radius to the tongue shutoff surface. In a first configuration of the feeder, the pouch assembly detenting structure is engaged with the first tongue detenting structure. To assume a second configuration of the feeder, a predetermined axial force is applied to the pouch assembly relative to the tongue to disengage the pouch assembly detenting structure from the first tongue detenting structure and to proximally slide the tongue shutoff surface along the distal portion of the pouch assembly inner surface until the pouch assembly detenting structure becomes engaged with the second tongue detenting structure and the tongue shutoff surface seals with the pouch shutoff surface. Any food present in the distal portion of the pouch assembly when the feeder is in the first configuration is proximally displaced into the proximal portion of the pouch assembly as a result of the feeder assuming the second configuration.

In one embodiment, the pouch assembly inner surface has a distal end. The pouch assembly detenting structure comprises an endless, radially inwardly extending bead formed adjacent the distal end of the pouch assembly inner surface. The first tongue detenting structure comprises an endless first groove formed on the tongue sidewall to be distal to the tongue shutoff surface, the second tongue detenting structure comprising an endless second groove formed on the tongue sidewall that is distally spaced from the first groove.

In one embodiment, the pouch assembly is integrally molded as a single piece. In an alternative embodiment, the pouch assembly comprises a pouch and a collar molded separately from the pouch. The pouch has an inner surface, an opposed outer surface and a distal end. In one embodiment, the pouch assembly shutoff surface, the pouch assembly detenting structure and the distal portion of the pouch assembly inner surface are all formed on the inner surface of the pouch. The collar has an inner sidewall that defines a central opening. The inner sidewall of the collar fits to the outer surface at the distal end of the pouch. In one embodiment, all of the holes in the pouch are formed in the proximal portion of the pouch.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
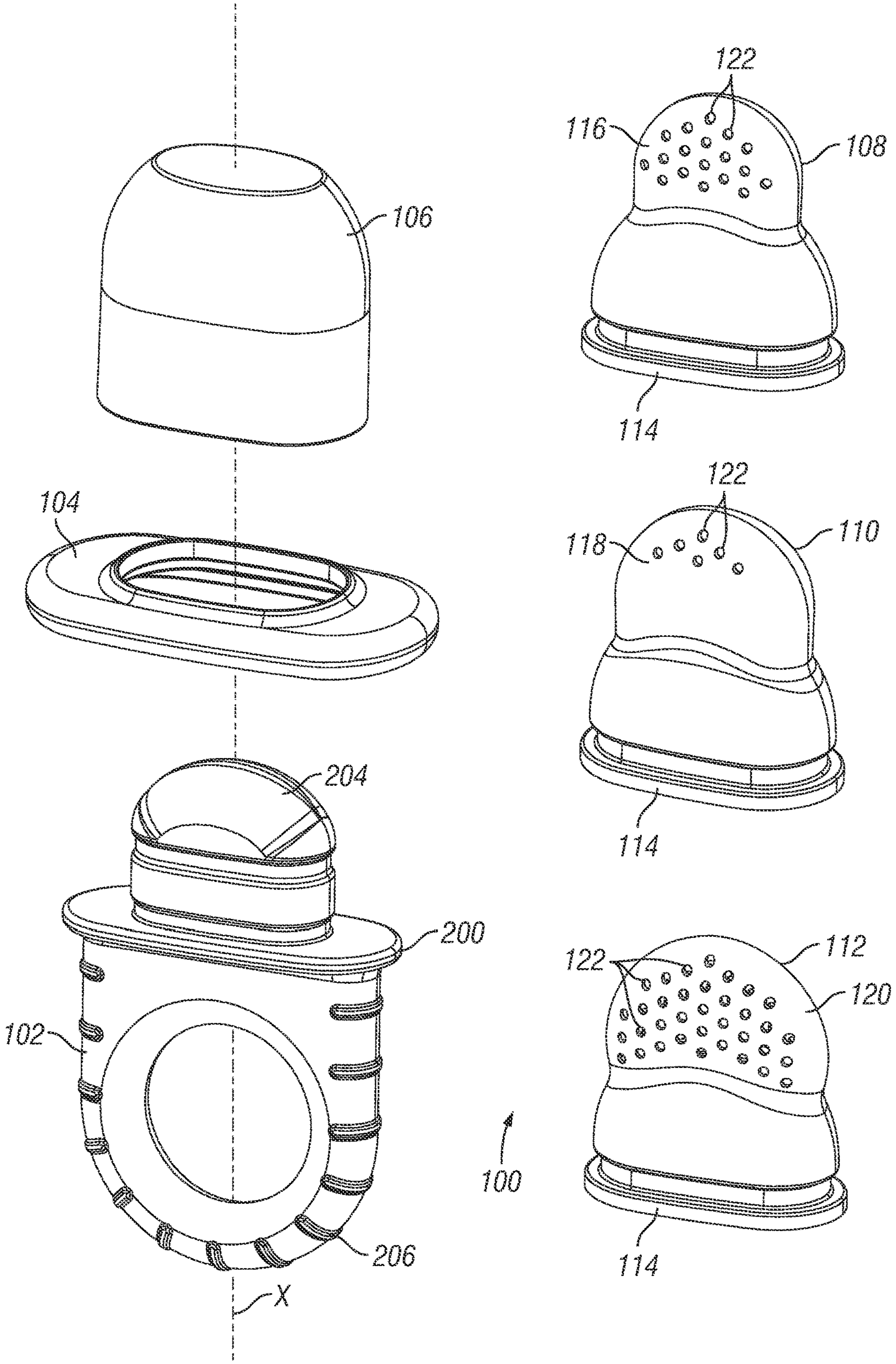
FIG. 1 is an exploded perspective view of an infant feeder kit including a handle, collar, cap and three pouches.
Figure 2:
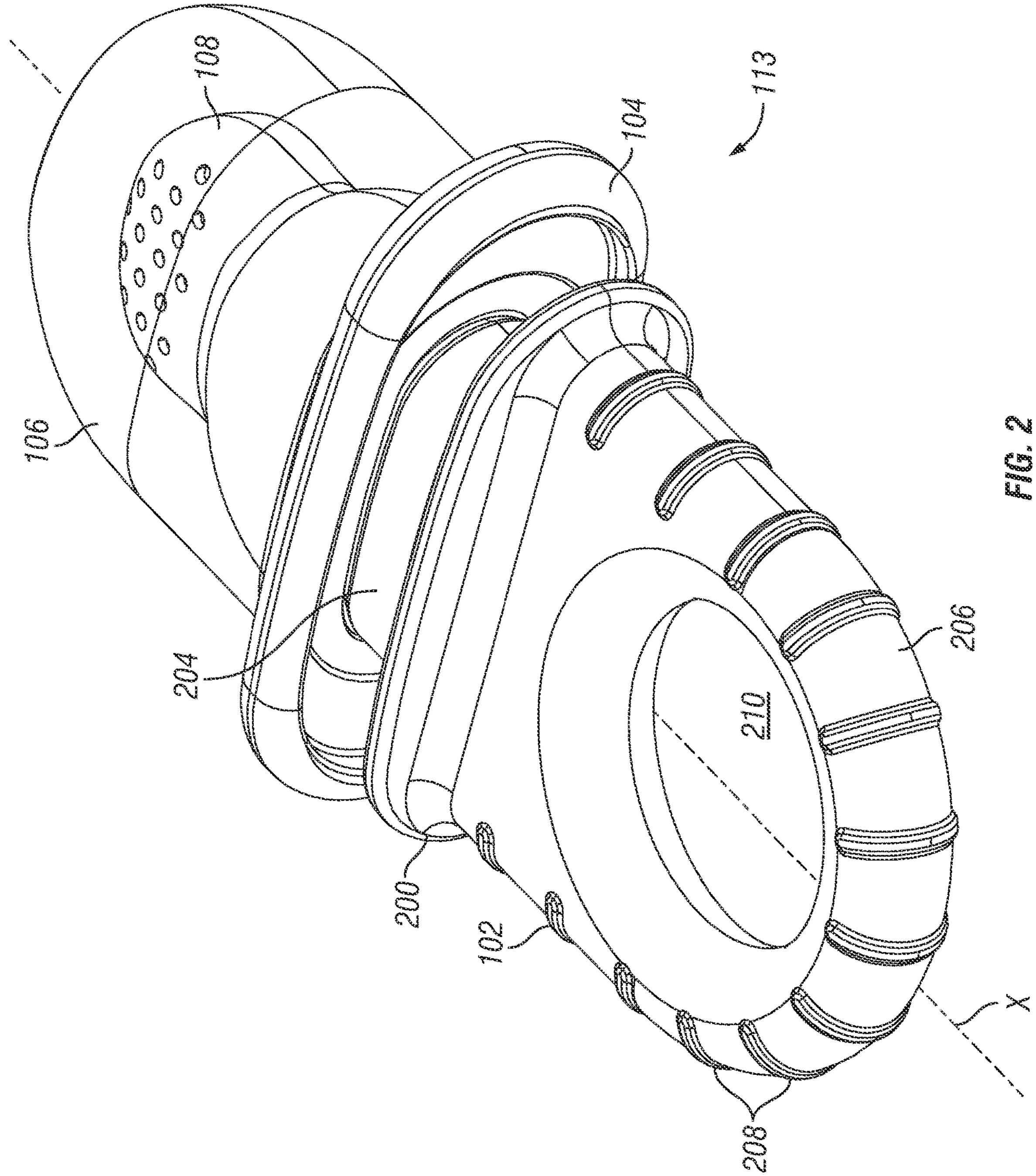
FIG. 2 is a perspective view of an assembled infant feeder in a first configuration.

As seen in FIG. 1, the invention may be provided to a consumer as a kit 100 including a handle 102, a collar 104, a cap 106, and a plurality of pouches, in the illustrated embodiment including three such pouches 108, 110 and 112. In an alternative embodiment, the kit may include only one such pouch. The caregiver selects one of the pouches 108, 110 or 112 for assembly with handle 102, collar 104 and cap 106, thereby constituting an infant feeder 113 (FIG. 2).

In use, the handle 102, collar 104, a selected one of the pouches 108-112 and the cap 106 are arranged on a proximal-distal axis X. As used herein, and to follow the feeder 113's function, "proximal" means towards the infant's mouth and "distal" means away from the infant's mouth, although the feeder 113 may be inverted for filling and storage, as will be described below.

The pouches 108, 110 and 112 may be injection-molded of a soft, pliable material such as silicone rubber. Distal portions 114 of the pouches 108-112 are identical to each other. Proximal portions 116, 118 and 120 of the respective pouches 108-112 are not. Each of the pouches is hollow. Each of the proximal portions 116, 118 and 120 has a plurality of holes 122 made therethrough, but their number varies. The size of the holes 122 made in pouch proximal portions 116, 118 and 120 may vary also.

The pouch 114 has a relatively small proximal portion 116. The "puree" proximal portion 118 is larger than proximal portion 116, but has many fewer holes 122. "Large" pouch 112 has a proximal portion 120 that is the largest of the three, and has the largest array of holes 122. The small pouch 108 may be used to contain a relatively small amount of food. The "puree" pouch 110 may be used contain a food whose viscosity is lower than usual, such that same amount of fluid pressure exerted on any food contents will cause more of food to squirt through the holes 122 of proximal portion 118. The large pouch 112 may be used to contain a relatively large amount of food.

In general, the feeder is adapted to dispense a food substance which has at least some of the characteristics of a fluid, although with a viscosity much higher than water. The food may be a finely chopped or divided solid with particle sizes smaller than the size of the holes in the pouch, such as chopped up fruits or vegetables. The food may also be frozen at the time the feeder is handed to the infant, and may for example consist of frozen berries or frozen liquids. Further, the food initially may be in solid form, but liquefies as a result of being contacted with the infant's saliva injected into the pouch 108-112 through holes 122. The feeder may be used to introduce new food flavors or textures to the infant. When the contents of the pouches 108-112 are not under any or only a small amount of fluid pressure, the food will not exude through holes 122, permitting a filled feeder 113 to be stored in a refrigerator or the like. But when more than a predetermined amount of fluid pressure, or partial vacuum, is applied to the food, the food will exude through the holes 122, to an exterior of the pouch 108-112 such as into the infant's mouth. The infant may, for example, suck on the pouch 108, 110 or 112, placing the food contained therein under a partial vacuum. And/or, the infant may bite the pouch 108, 110 or 112, producing a deformation which increases the fluid pressure being placed on the food.

As seen in FIG. 2, handle 102 has a handle portion 206 that extends distally from a base 200 of the handle 102. The handle portion 200 may have an array of textured ribs 208 to enhance the infant's grip on the handle portion 206. As an additional gripping aid, the handle portion 206 may have a large interior circular hole 210 into which the infant may curl his or her fingers.

In one embodiment, the cap 106 is transparent, so as to reveal the pouch which the cap covers. In FIG. 2, use of the "small" pouch 108 is illustrated, while the feeder shown in FIGS. 5 and 7-11, use the "large" pouch 112 as a component. It should be understood that any of pouches 108-112 could be substituted and have the same functions and features unless otherwise described.

A tongue 204 is partially visible in FIG. 2. In the illustrated embodiments tongue 204 is integrally molded with handle portion 206 and base 200, and extends proximally from the base 200. The tongue may be molded of a silicone rubber compound. The tongue 204 is shown in a first configuration relative to the cap 106, pouch 108 and collar 104, in which the tongue 204 has not been advanced very far into the interior of pouch 108. The collar 104 is fitted to the distal end of pouch 108 and the cap 106 is removably joined to the pouch 108 in a manner that will be described below.

Figure 3:
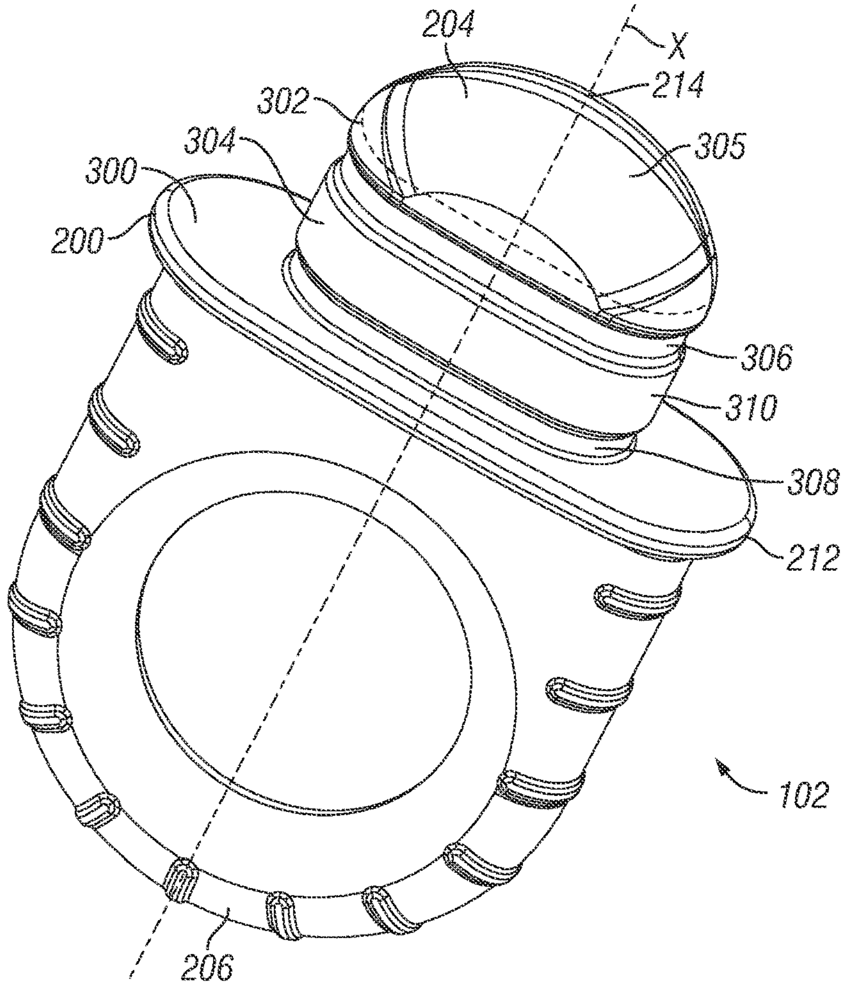
FIG. 3 is a proximal perspective view of the handle shown in FIG. 1.
Figure 3A:
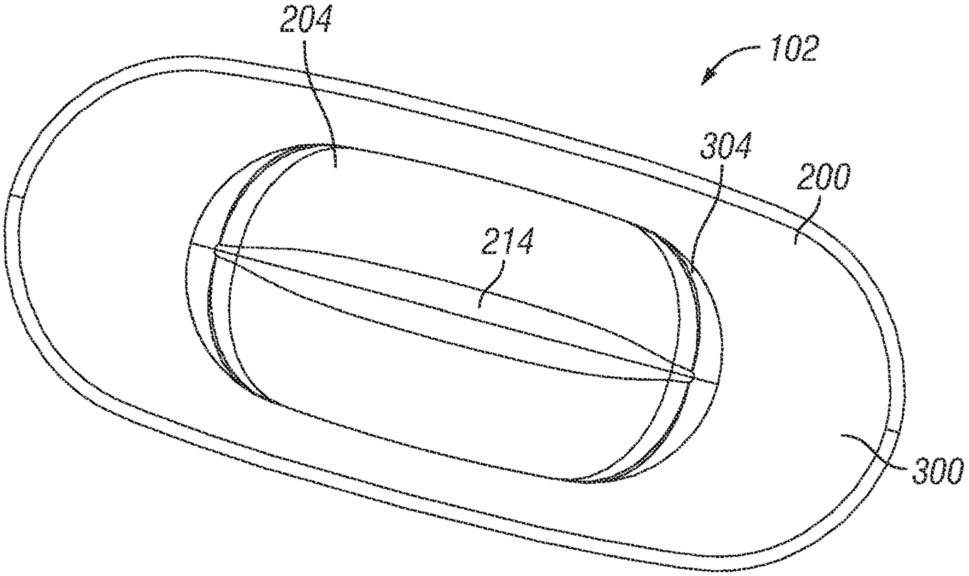
FIG. 3A is a proximal view of the handle shown in FIG. 3.

As seen in FIG. 3, the base 200 has a lateral margin 212 that completely contains and is radially outwardly spaced from the tongue 204. The base 200 has a flat, proximally-facing surface 300 that surrounds the tongue 204 (FIG. 3A).

The tongue 204 has a proximal end 214 which in the illustrated embodiment is rounded. A tongue sidewall 304 distally extends from proximal end 214 to the base 200. The sidewall 304 includes a curved, axially circumferential shutoff surface 302 that is distally displaced from end 214. In the illustrated embodiment, the shutoff surface is only a distal part of a rounded end surface 305 and is at a maximum radius from axis X; that is, shutoff surface 302 is radially spaced from axis X by a greater amount than the rest of surface 305.

A first tongue detenting structure 306 is formed in sidewall 304 to be distal to the shutoff surface 302. In the illustrated embodiments, the first tongue detenting structure 306 takes the form of an endless and axially circumferential groove, but it could take other forms, such as a non-endless depression, an eminence, or a series of these. A second detenting structure 308 is formed on the tongue sidewall 304 to be distally spaced from first detenting structure 306 by a sidewall portion 310. In the illustrated embodiments, the second tongue detenting structure 308 is an endless and axially circumferential groove and is parallel to first groove 306. Second tongue detenting structure 308 could also take other forms. In the illustrated embodiments, the first and second grooves 306, 308 are orthogonal to axis X. The second groove 308 is in the illustrated embodiment immediately adjacent to base proximal surface 300.

The sidewall portion 310 is straight in any axial plane, and has a uniform cross section throughout its axial length. In axial cross section, tongue 204 in general can take the shape of a flattened oval, and as such conforms to infant oral anatomy.

In alternative embodiments, the tongue 204 may have further detenting structures axially spaced from the first and second detenting structures. In these alternative embodiments, the further detenting structures may take a form that is similar to the form of the first and second detenting structures.

Figure 4:
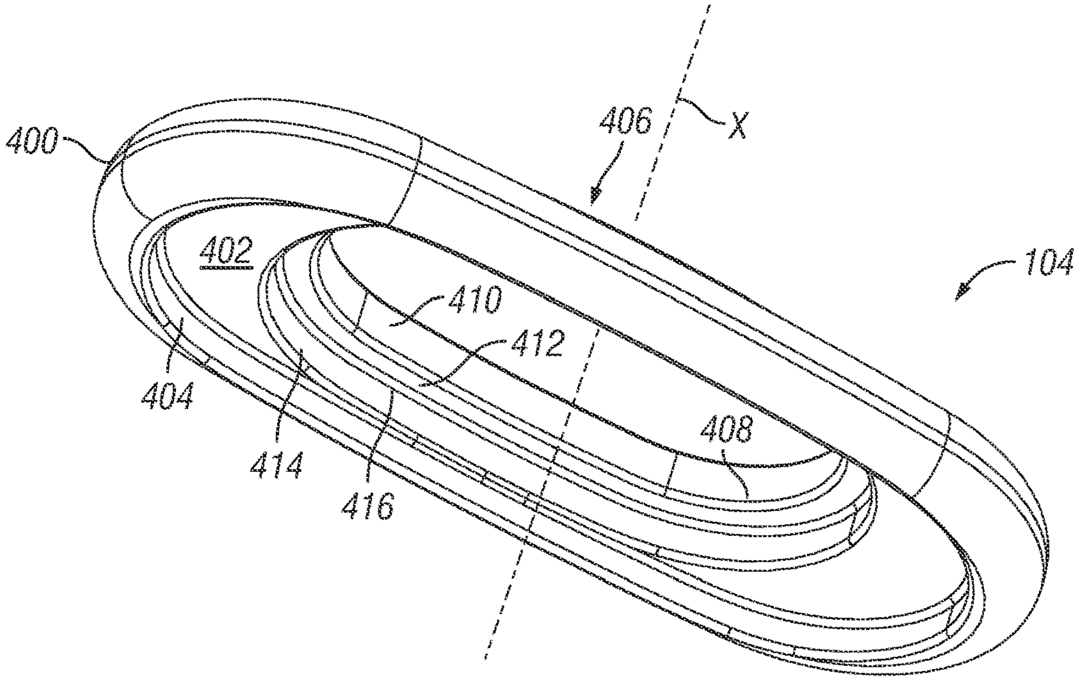
FIG. 4 is a distal perspective view of the collar shown in FIG. 1.

The collar 104 has an outer margin 400 (FIG. 4) that, in any particular axial plane, is at a greater distance from axis X than any other component of feeder 113. A distal surface 402 is flat, orthogonal to axis X and mates with proximal surface 300 of base 200 when the feeder is in the second configuration. An axially circumferential surface 404 distally extends from surface 402 and fits to base margin 212 when the feeder is in the second configuration.

The collar 104 (FIG. 4) has a central opening 406 through which axis X extends, and which is defined by an inner sidewall 408. The sidewall 408 has an axially aligned proximal segment 410. A distally-facing surface 412 extends radially outwardly from proximal segment 410 and is orthogonal to axis X. An axially aligned surface 414 distally extends from a radially outward margin of the surface 412 to surface 402. The surfaces 412 and 414 together form a collar groove 416 that receives a pouch flange, as will be hereinafter described.

Figure 5:
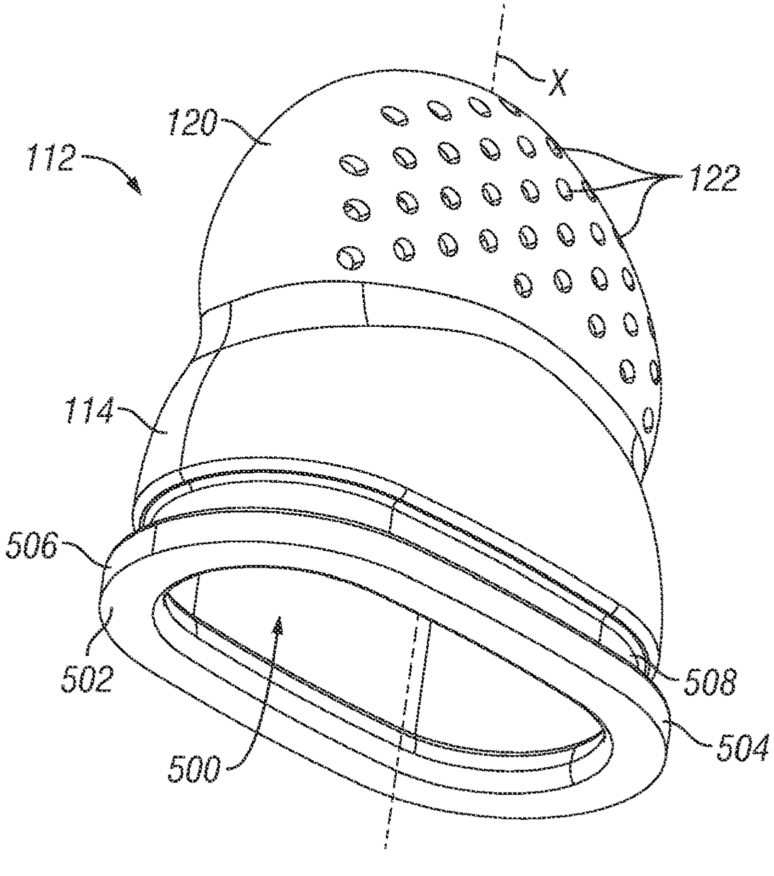
FIG. 5 is a distal perspective view of a "large" pouch adapted for use as a component of the infant feeder.

Each pouch 108, 110, 112 is adapted to fit within collar 104. Collar 104 may be molded of a thermoplastic compound such as polypropylene. As seen in FIG. 5, each pouch distal portion 114 has an open distal end 500 at which is located a distally facing, flat, axially orthogonal surface 502. Surface 502 is the distal surface of a radially outwardly extending, annular pouch flange 504, which is received in collar groove 416. When e.g. pouch 112 is fitted into collar 104, surface 502 will be coplanar with surface 402 of collar 104. The pouch flange 504 has a radially outward, axially aligned margin 506 that, when the pouch is installed in the collar 104, will mate with collar groove surface 414. In the illustrated embodiment, and immediately proximal to pouch flange 504, is a circumferential pouch groove 508 that receives collar inner sidewall surface segment 410. Pouches 108-112 may be molded of a silicone rubber compound that, when solidified, is more yieldable than the compound used to mold handle 102.

Figure 6A:
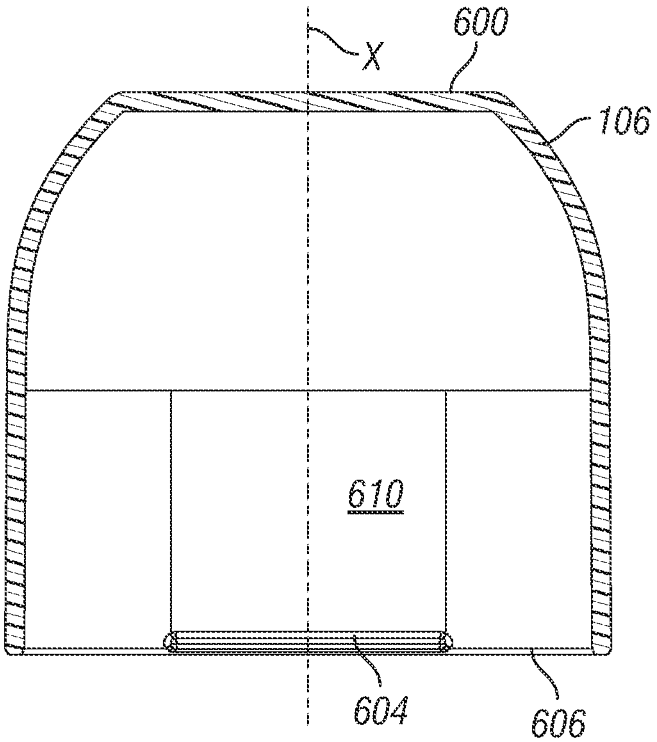
FIG. 6A is an axial sectional view of a cap of the infant feeder.
Figure 6B:
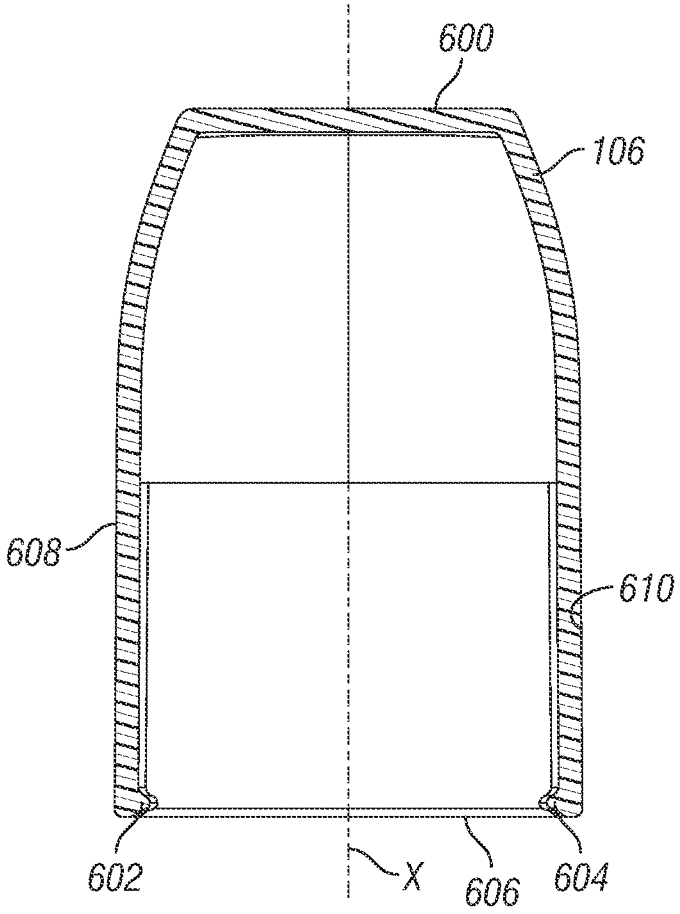
FIG. 6B is an axial sectional view of the cap shown in FIG. 6A, taken in a plane at 90 degrees to the sectional plane shown in FIG. 6A.

Cap 106 (FIGS. 6A and 6B) may be molded of polypropylene and is sized to fit over and attach to each of the pouches 108-112. Cap 106 has a flattened proximal end 600 that, when inverted, allows the feeder 113 to be stood on its proximal end on a flat surface. In one embodiment, two flanges 602 and 604 radially inwardly extend from a distal end 606, are opposed to each other, and only are present on the wider sides 608, 610 of the cap 600. Flanges 602 and 604 aid in frictionally engaging the cap to the pouch assembly. In another embodiment, the flanges 602 and 604 are omitted.

Figure 7:
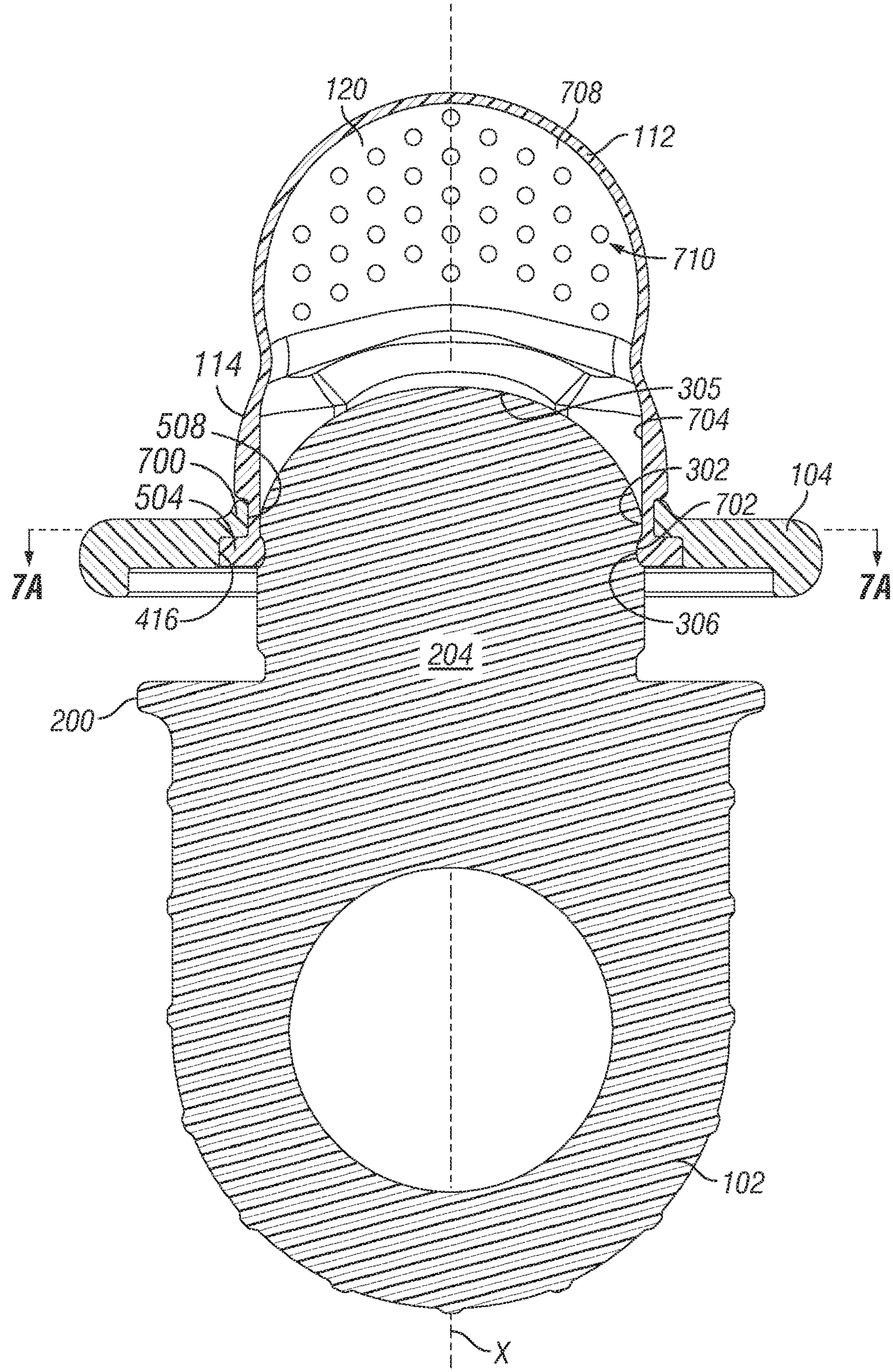
FIG. 7 is an axial sectional view of a feeder in a first configuration, showing the positions of the handle, collar and the "large" pouch.
Figure 7A:
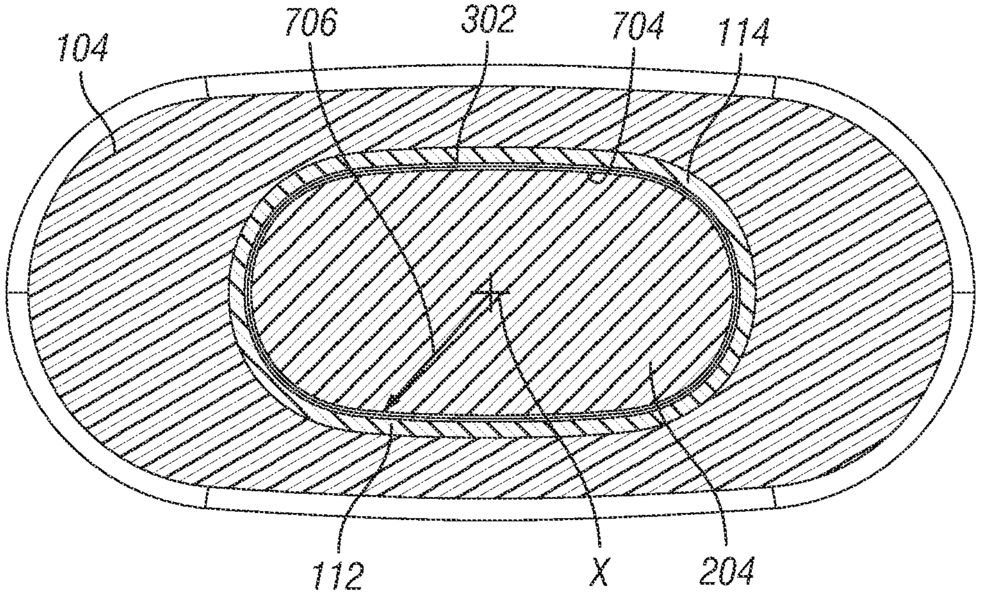
FIG. 7A is a proximal sectional view taken substantially along line 7A-7A of FIG. 7.

FIGS. 7 and 7A show an assembled feeder (less cap 106) in a first configuration. A flange 504 of pouch 112 has been fitted into the collar groove 416, and an inwardly extending collar flange 700 has been fitted into the collar groove 416. Thereafter, pouch 112 (and its contents) and collar 104 may be manipulated as a unit. A radially inwardly extending, circumferential bead 702, in this embodiment an inward extension of the pouch flange 504, closely fits in first tongue groove 306. Bead 702 is one possible form of a pouch detenting structure meant to engage with either first tongue detenting structure 306 or second tongue detenting structure 308, and its shape will be the reverse of that of structures 306, 308.

An inner surface 704 of pouch distal portion 114 proximally extends from bead 702 and is aligned with axis X. As seen in FIG. 7A, any radius in a particular axial plane, such as radius 706, to shutoff surface 302 will match the radius taken in that plane and in that direction to inner surface 704 of pouch distal portion 114. This means that shutoff surface 302 effectively seals to inner surface 704. In the illustrated embodiment, the axial cross sections of inner surface 704 and shutoff surface 302 are both flattened ovals. Other shapes for shutoff surface 302 and surface 704 could be selected, but they should be congruent to each other.

As seen in FIG. 7, an inner surface 708 of pouch 112 and proximal surface 305 of tongue 204 bound, and together define, a food volume 710. In the first configuration, food volume 710 is at its maximum extent.

Figure 8A:
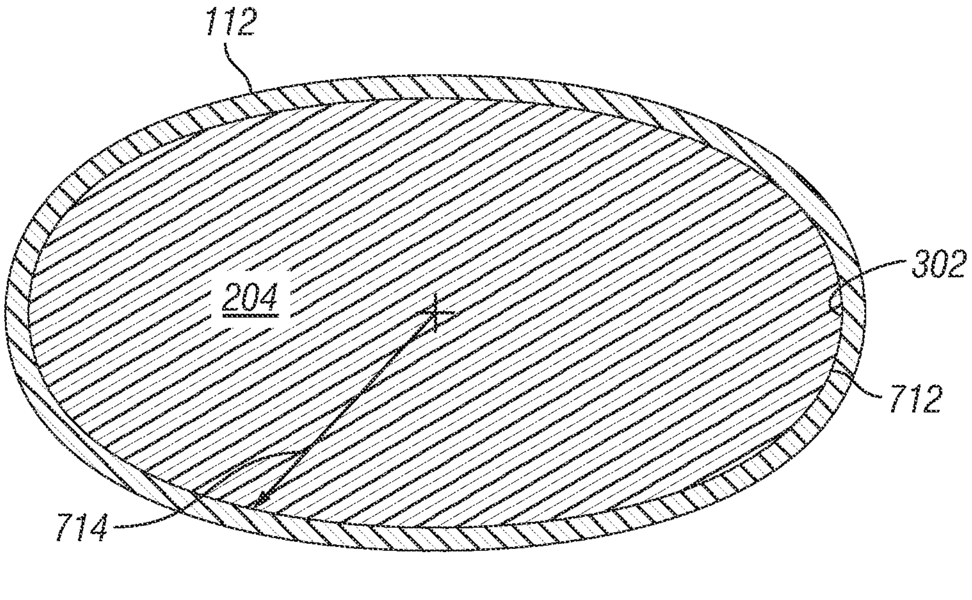
FIG. 8A is a distal sectional view taken substantially along line 8A-8A of FIG. 8.
Figure 8:
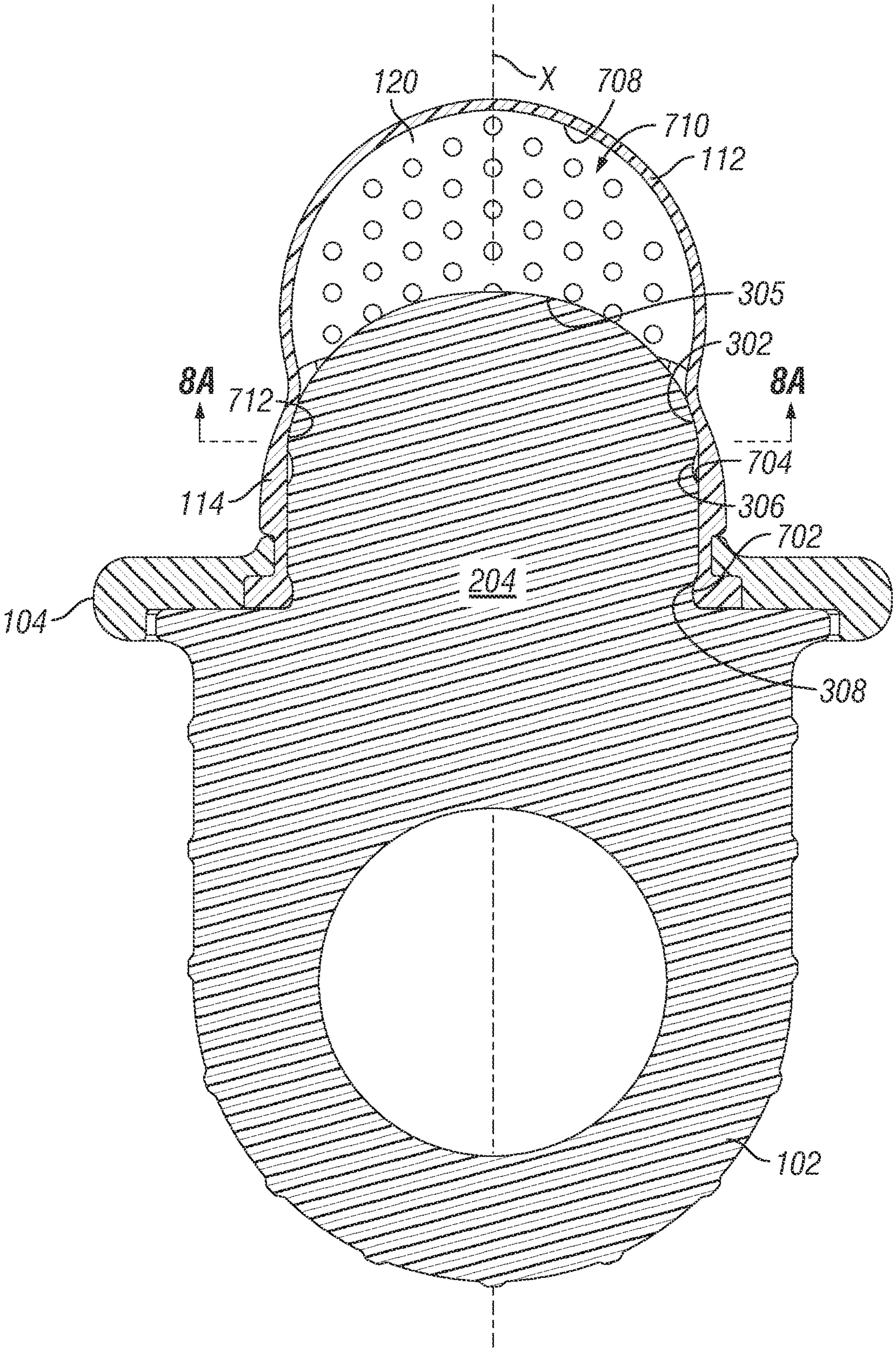
FIG. 8 is an axial sectional view from the same viewpoint and showing the same components as are shown in FIG. 7, but with showing the components in a second configuration.

FIGS. 8 and 8A show the feeder depicted in FIGS. 7 and 7A, but in the second or advanced configuration. In order to adopt the second configuration, a predetermined axial force is applied to collar 104 and pouch 112 relative to handle 102, so as to compress these two units together; this force could either be in a distal direction on collar 104, or in a proximal direction on handle 102, or some combination of the two. The force must be sufficient to force bead 702 out of first groove 306, to cause shutoff surface 302 to slide proximally along pouch surface 704, and to cause bead 702 to enter into second tongue groove 308.

As this is happening, the tongue shutoff surface 302 advances proximally until it abuts and seals with a pouch shutoff surface 712. The pouch shutoff surface 712 is a portion of pouch inner surface 708 and is disposed at a transition between pouch proximal portion 120 and pouch distal portion 114. An axially orthogonal radius to a proximal portion of pouch shutoff surface 712, in any axial plane, is less than a radius in such plane (such as radius 706) to inner surface 704. FIG. 8A is an axial cross section of tongue 204 and pouch 120 taken at a location at which the shutoff surfaces 302, 712 seal to each other. In this plane, a radius taken in any particular axial plane and direction, such as radius 714, to the shutoff surface 302 will be the same as a radius in that plane and in that direction to the shutoff surface 712. At locations proximal to but near the plane shown in FIG. 8A, an axially orthogonal radius taken to pouch inner surface 708 will be less than an axially orthogonal radius to tongue shutoff surface 302 taken distally to it but in the same plane; the pouch inner surface 708 is necked down in this region. As a result of advancing the tongue 204 proximally into pouch 112, the food volume 710 decreases.

In those embodiments (not shown) in which there are third, fourth, etc. detenting structures axially spaced along the sidewall of tongue 204, each of those detenting structures defines a separate feeder configuration, which therefore can assume third, fourth, etc. configurations.

Figure 9A:
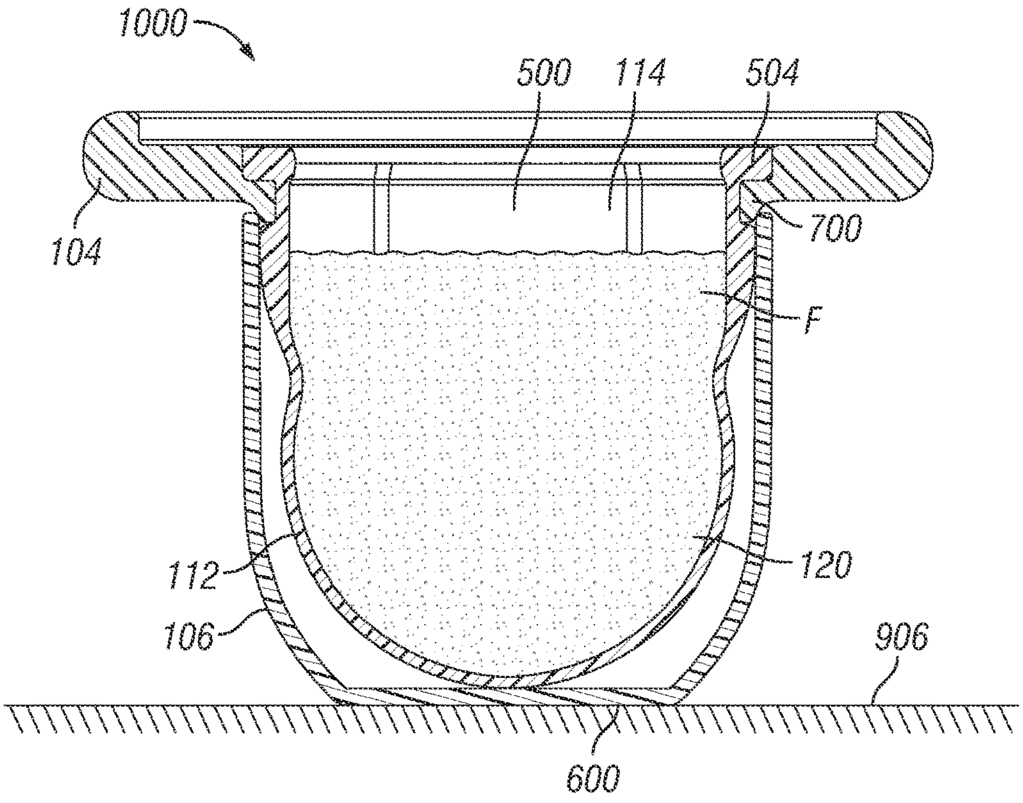
FIG. 9A is an axial sectional view of a cap, a "large" pouch and a collar, stood on a proximal end of the cap and after the pouch has been filled with food.
Figure 9B:
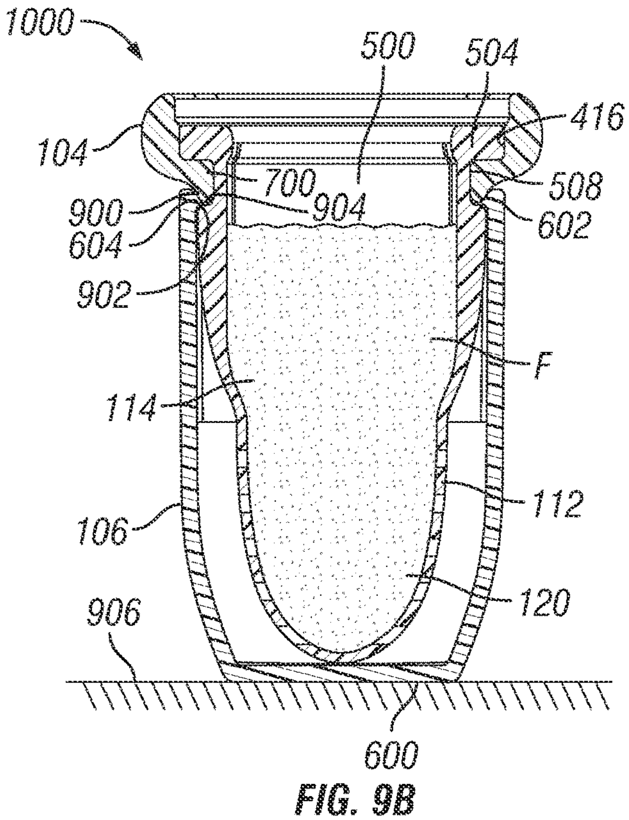
FIG. 9B is an axial sectional view taken in a plane 90 degrees from FIG. 9A.

FIGS. 9A-10C illustrate various steps in the use of the feeder. As seen in FIGS. 9A and 9B, a pouch, such as "large" pouch 112, is assembled to the collar 104 by snapping collar flange 700 into collar groove 508. This creates a pouch assembly 1000. In this condition the pouch flange 504 is received in collar groove 416. As so assembled, an outwardly facing surface 900 (FIG. 9B) of the collar flange 700 and a distally facing outer surface 902 of the pouch groove 508 make a small groove 904 into which cap flanges 602 and 604 may be received. This permits the cap 106 to be fitted over the pouch 112. The flat proximal end of cap 600 is set on a convenient flat horizontal surface 906. Food F is then loaded into the open end 502 of pouch 112. The oval shape of pouch end 502 makes the loading operation, as done by a spoon, easier. After loading, food F will occupy all of distal pouch portion 120 and a good part of proximal pouch portion 114.

Figure 10A:
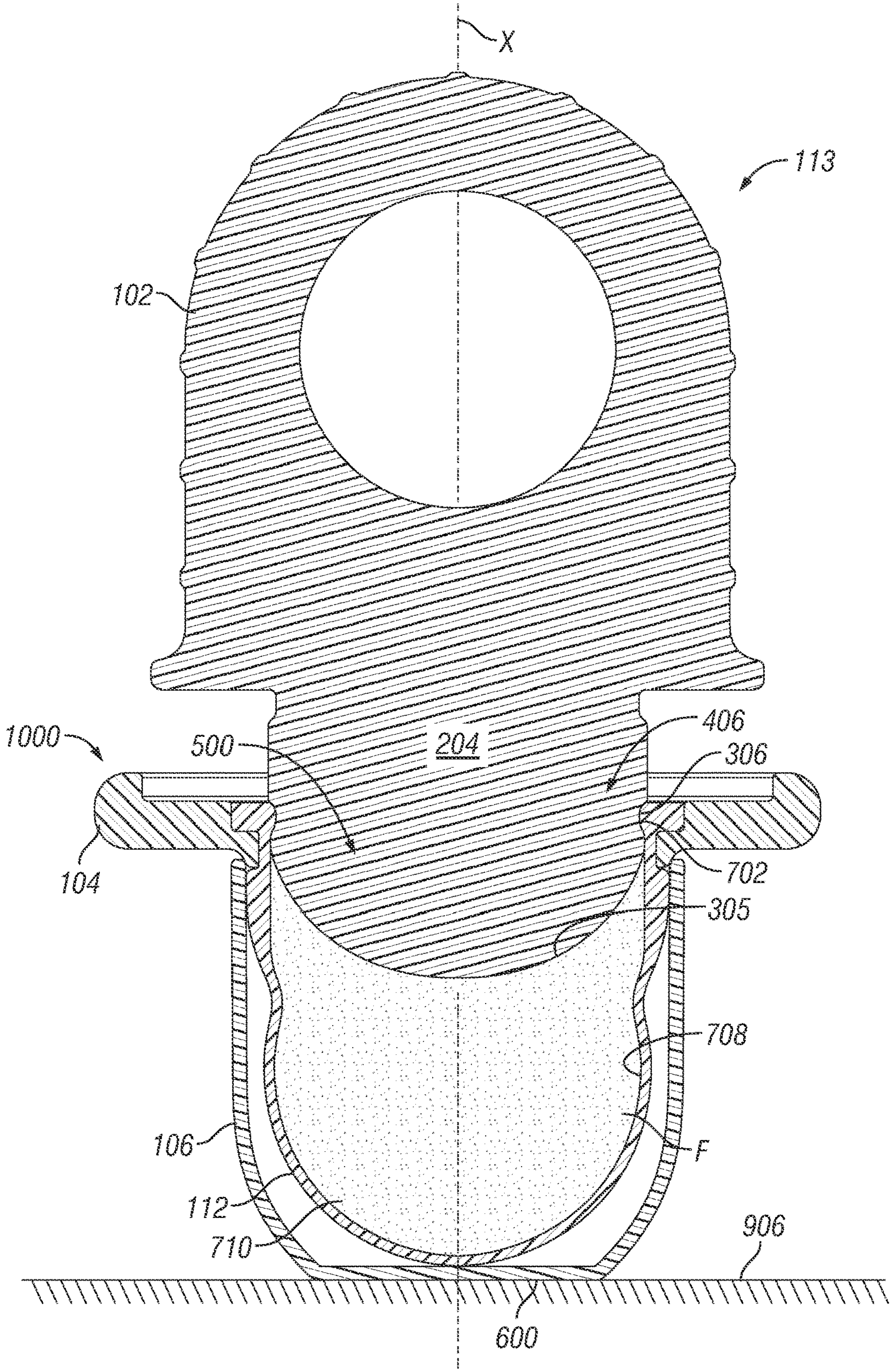
FIG. 10A is an axial sectional view of a cap, "large" pouch filled with food, collar and handle; in a condition in which the filled feeder can be stored.

As seen in FIG. 10A, the tongue 204 is then inserted through the central collar opening 406 and the distal end 500 of pouch 112, until the first tongue detenting structure or groove 306 receives the pouch detenting structure or bead 702. In this condition, food F will occupy the entire food volume 710, which has been bounded by and defined by leading surface 305 of the tongue 204 and the inner surface 708 of the pouch 112. The completed and filled feeder 113 may be stored in this condition. In some embodiments, food F may be become frozen.

Figure 10B:
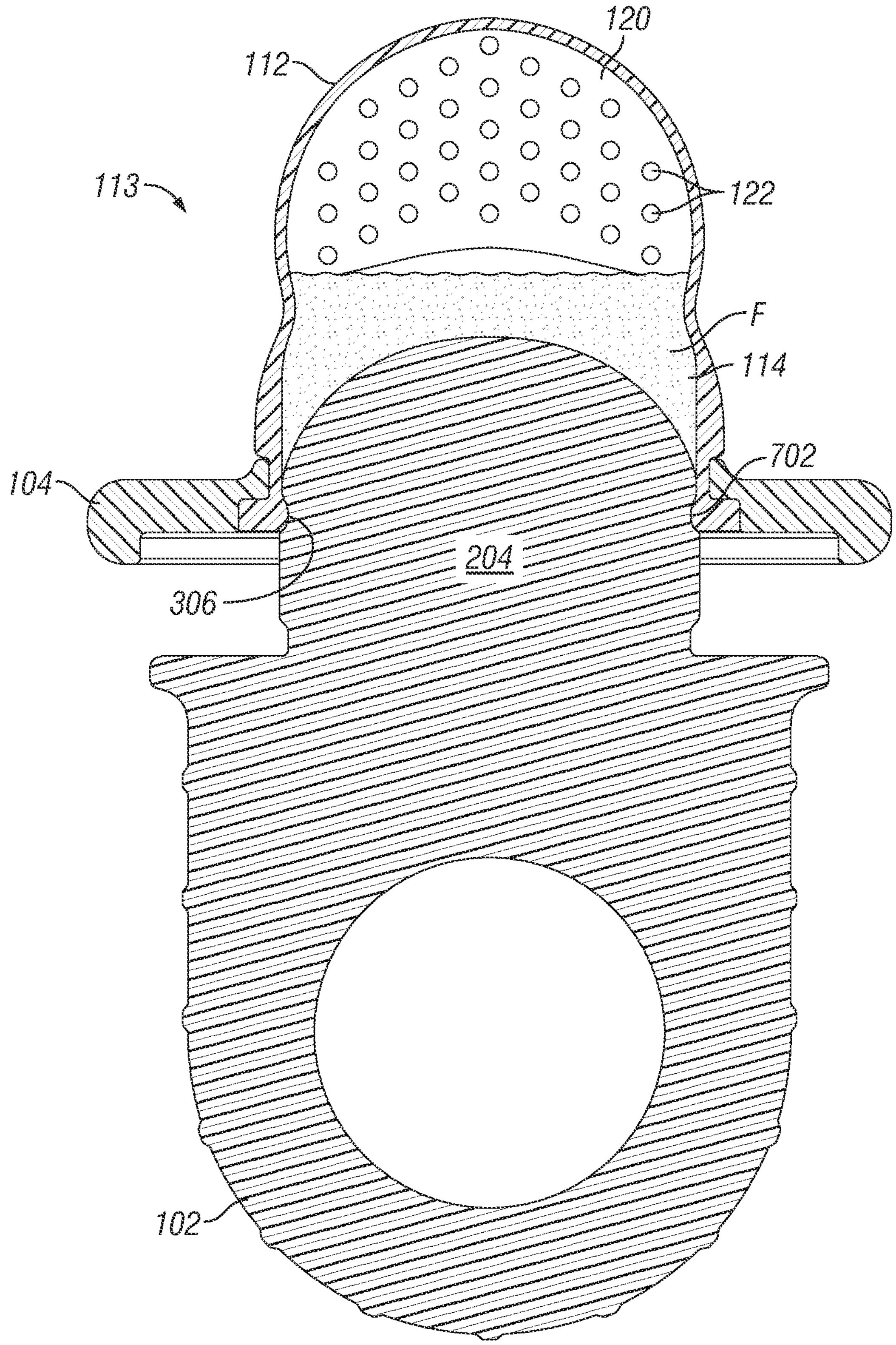
FIG. 10B is an axial sectional view of an assembled feeder in the first configuration, after an infant has ingested all of the food in a proximal portion of the pouch.

At some point after this, and when it becomes time to feed the infant, the cap 106 is removed from the feeder 113 and the feeder 113 is given to the infant. The infant will bite on proximal portion 120 and suck food F out of holes 122, until the proximal portion 120 of the pouch 112 is empty. This condition is seen in FIG. 10B. The distal portion 114 of pouch 112 is still full of food F.

Figure 10C:
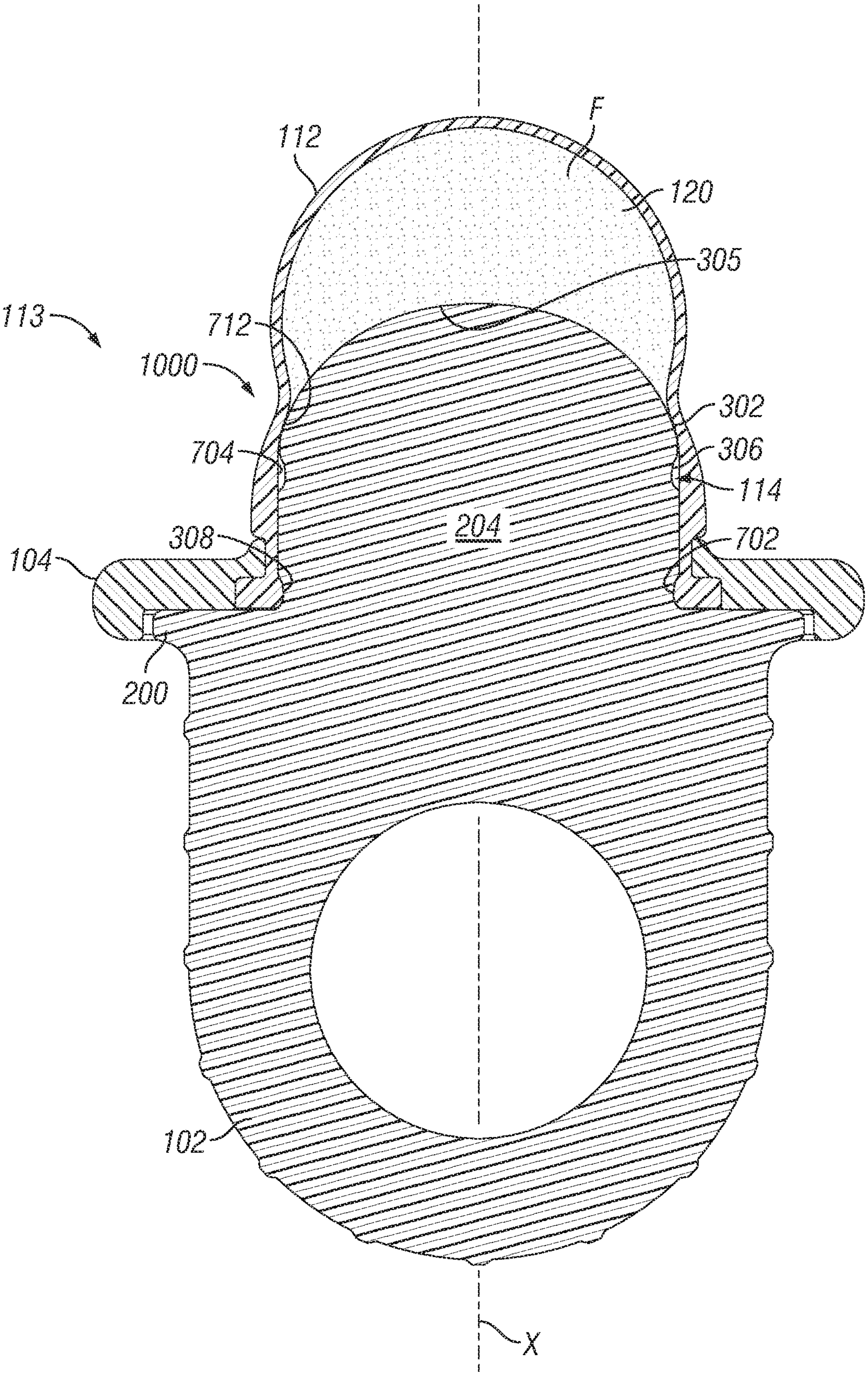
FIG. 10C is an axial sectional view of assembled feeder in a second configuration, showing the displacement of food into the proximal portion of the pouch from the distal portion of the pouch.

To continue the feeding of the infant, and as seen in FIG. 10C, the caregiver applies axial force to urge collar 104 toward handle base 200. The force must be sufficient to force the pouch bead 702 out of the first tongue groove 306, to push the pouch assembly 1000 down the pouch inner surface 704, and to make the bead 702 enter second tongue groove 308. As this is being done, the tongue leading surface 305 is pushing food F into the distal pouch portion 120. The tongue shutoff surface 302 sealably slides along surface 704 until the pouch shutoff surface 712 is met. At the conclusion of this spatial translation, all remaining food F is in pouch proximal portion 120. The feeder 113 may then be returned to the infant and feeding continued.

Figure 11:
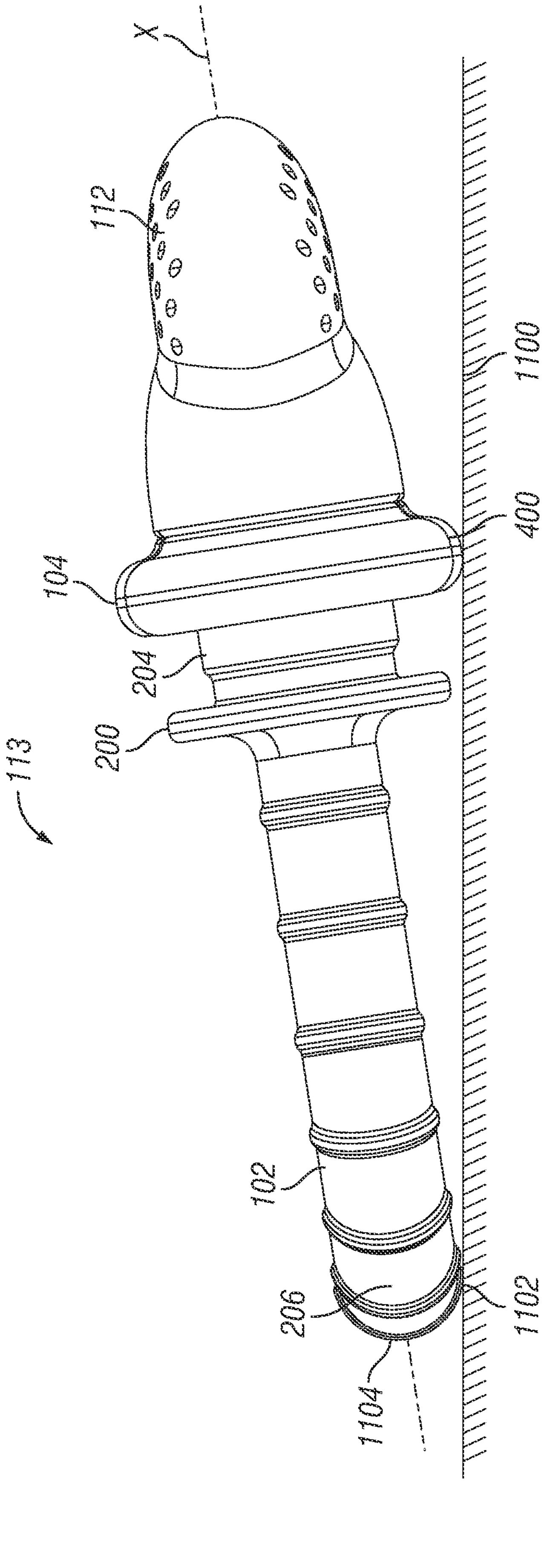
FIG. 11 is a side view of a feeder in the first configuration, being supported on a horizontal surface.

FIG. 11 shows an assembled feeder 113 lying on a horizontal surface 1100. In this condition the pouch 112 may or may not be covered by cap 106; FIG. 11 illustrates the possibility where pouch 112 is not covered. An outer surface 1102 of handle portion 206, near its distal end 1104, contacts the surface 1100. Surface 1102 is much closer to axis X than is collar outer margin 400, which is also contacting the surface 1100, and this relationship will obtain regardless of how the feeder 113 is laid on the surface 1100, because the outer margin 400 radially outwardly extends from axis X by an amount that is greater than any other component of feeder 113 in any given axial plane. Further, lateral margin 400 acts as a fulcrum, with the mass of handle portion 206, base 200 and some of tongue 204 on one side, and the mass of the rest of tongue 204, pouch 112, any food pouch 112 is now containing, and any cap 106, on the other. Preferably the handle portion 206 is extensive enough, and is molded from a polymer compound that is heavy enough, that even where pouch 112 and collar 104 are pushed down on tongue 204 to the second configuration as shown in FIG. 10C, surface 1102 of the handle portion 206 will be resting on surface 1100 rather than any structure located proximally from margin 400. This means that pouch 112, even when not covered by cap 106, is less likely to become contaminated.

Figure 12A:
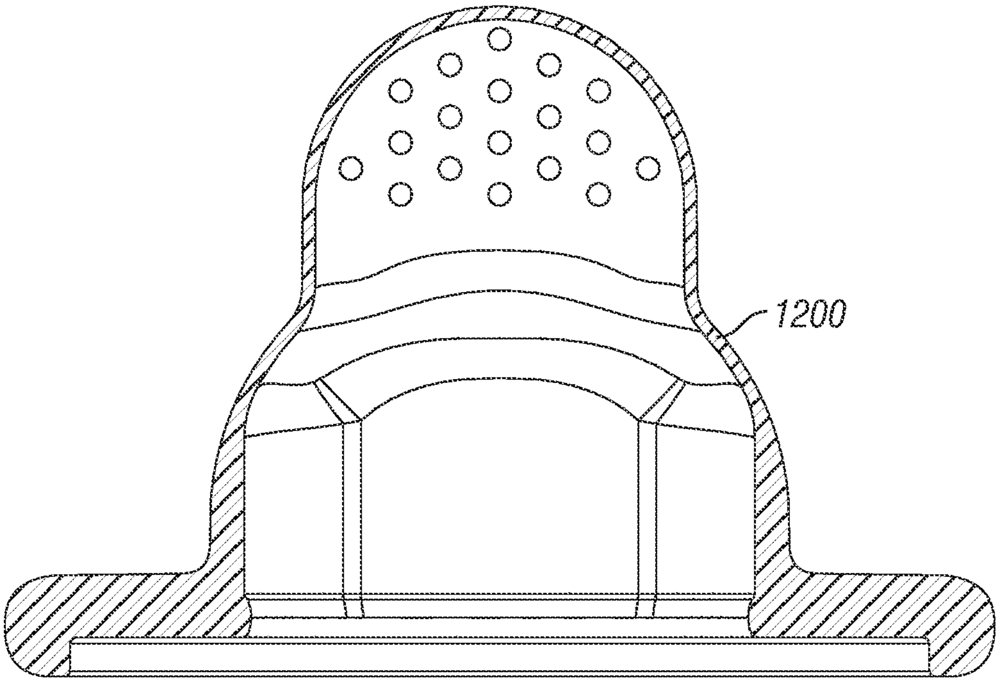
FIG. 12A is a "small" pouch assembly in which the pouch and collar have been integrally molded as a single piece.
Figure 12B:
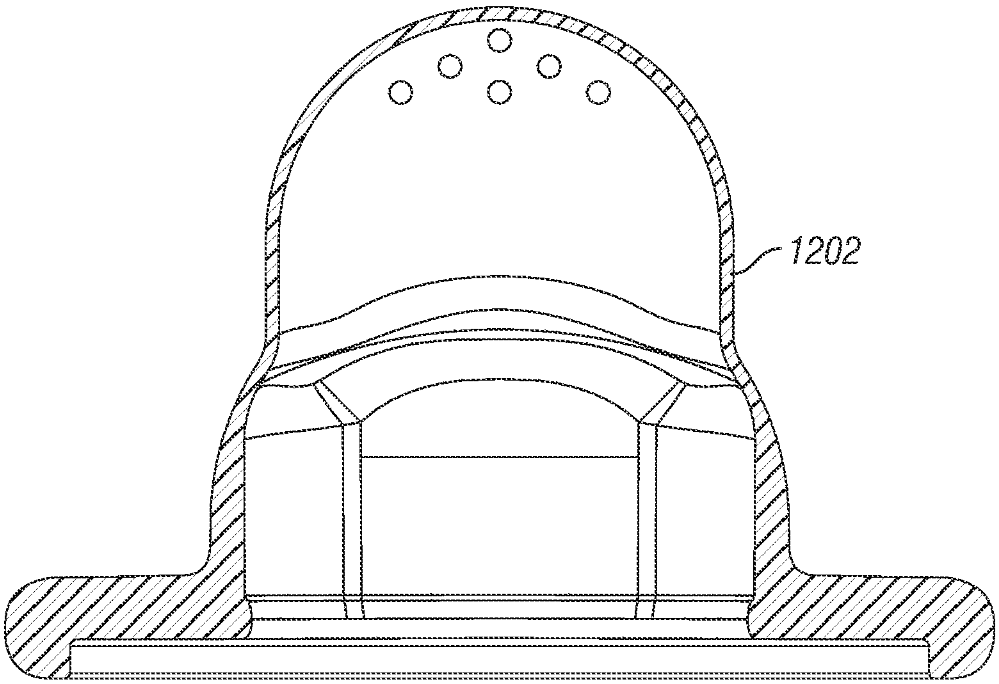
FIG. 12B is a "puree" pouch assembly in which the pouch and collar have been integrally molded as a single piece.
Figure 12C:
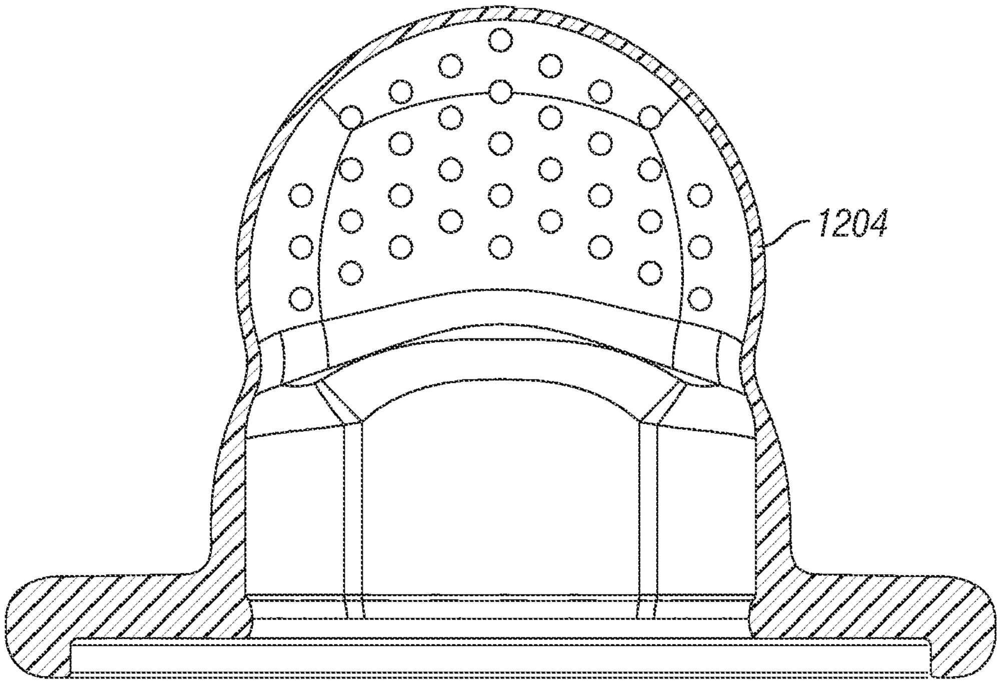
FIG. 12C is a "large" pouch assembly in which the pouch and collar have been integrally molded as a single piece.

FIGS. 12A-12C illustrate alternative pouch assemblies 1200-1204, each of which are integrally molded as a unit. Pouch assembly 1200 (FIG. 12A) takes the place of an assembly of "small" pouch 108 and collar 104. Pouch assembly 1202 (FIG. 12B) takes the place of an assembly of "puree" pouch 110 and collar 104. Pouch assembly 1204 (FIG. 12C) takes the place of an assembly of "large" pouch 112 and collar 104. Each of the integral pouch assemblies 1200-1204 may be used with the handle 102 and the cap 106 in the same way as above described for the two-part assemblies 1000.

In summary, an infant feeder has been shown and described in which a pouch assembly may be linearly translated, relative to a tongue of a handle, from a first configuration to a second configuration, thereby displacing all the food therein to a proximal portion of the pouch. While illustrated embodiments of the present invention have been described and have been illustrated in the appended drawings, the present invention is not limited thereto but only by the scope and spirit of the appended claims.

We claim:

1. An infant feeder comprising:

a handle formed on a proximal-distal axis, the handle comprising:

a base extending laterally with respect to the handle, the handle being defined below a horizontal plane corresponding to the base; and a tongue extending vertically from the base in an opposite direction from the handle, a proximal surface of the tongue bounding a food volume adapted to be filled with food, a width of the tongue being less than both a width of the base and a width of the handle, the tongue comprising:

a tongue sidewall comprising a first tongue detenting structure and a second tongue detenting structure distally spaced from the first tongue detenting structure, the first tongue detenting structure and the second tongue detenting structure being defined above the horizontal plane corresponding to the base; and a pouch assembly comprising:

a pouch comprising a pouch sidewall formed of a flexible material and bounding the food volume, the pouch sidewall comprising a plurality of holes permitting the flow of food therethrough; and an inner surface comprising a pouch assembly detenting structure, the infant feeder being adjustable between a first configuration and a second configuration, in the first configuration, the pouch assembly detenting structure is engaged with the first tongue detenting structure, and in the second configuration, the pouch assembly detenting structure is engaged with the second tongue detenting structure in response to a predetermined axial force being applied to disengage the pouch assembly detenting structure from the first tongue detenting structure the food volume in the first configuration being greater than the food volume in the second configuration.

2. The infant feeder of claim 1, wherein the first tongue detenting structure is a first groove formed on the tongue sidewall, the second tongue detenting structure is a second groove formed on the tongue sidewall to be distally spaced from the first groove, and the pouch assembly detenting structure is a radially inwardly extending bead adapted to be received by the first tongue detenting structure or the second tongue detenting structure.

3. The infant feeder of claim 1, wherein the first tongue detenting structure, the second tongue detenting structure and the pouch assembly detenting structure extend around the axis.

4. The infant feeder of claim 1, wherein the pouch assembly is integrally molded as a single piece.

5. The infant feeder of claim 1, wherein the pouch assembly comprises a pouch having a distal end, an inner surface of the pouch extending proximally from the distal end, and an outer surface of the pouch opposed to the inner surface and extending proximally from the distal end, a collar with an collar inner sidewall defining a central opening, the inner sidewall of the collar fitting around the outer surface of the pouch at the distal end of the pouch, the pouch assembly detenting structure formed on the inner surface of the pouch.

6. The infant feeder of claim 5, wherein the collar is molded of a first polymer compound and the pouch is molded of a second polymer compound that is more yieldable than the first polymer compound.

7. The infant feeder of claim 5, wherein the pouch is molded of silicone rubber.

8. The infant feeder of claim 5, wherein the pouch is a first pouch, the infant feeder being a portion of a kit that further includes at least a second pouch, the second pouch differing from the first pouch based on one or more of a number of holes in the first pouch, a size of the holes of the first pouch, or a size of the food volume.

9. The infant feeder of claim 5, wherein a radially outwardly extending pouch flange is formed on the outer surface of the pouch at the distal end of the pouch, a pouch-receiving groove formed in the inner sidewall of the collar to receive the pouch flange.

10. The infant feeder of claim 9, wherein the distal surface of the collar includes a horizontal portion, a distal surface of the lower end of the pouch being coplanar with the horizontal portion of the distal surface of the collar, such that the distal surface of the lower end of the pouch and the horizontal portion of the distal surface of the collar will mate with the proximal surface of the base when the infant feeder is in the second configuration.

11. The infant feeder of claim 5, wherein the base has a proximal surface and the collar has a distal surface, the distal surface of the collar mating with the proximal surface of the base when the infant feeder is in the second configuration.

12. The infant feeder of claim 1, further comprising a cap that is frictionally fitted over the pouch assembly to cover the pouch.

13. An infant feeder comprising:

a handle formed on a proximal-distal axis, the handle having a base, a handle portion of the handle distally extending from the base and a tongue of the handle proximally extending from the base, the tongue having a proximal end, a tongue sidewall distally extending from the proximal end of the tongue;

a radially inwardly extending, circumferential first groove formed on the tongue sidewall, a radially inwardly extending, circumferential second groove formed on the tongue sidewall, a circumferential sidewall portion of the tongue sidewall distally spacing the first groove from the second groove, the circumferential sidewall portion having a uniform cross section;

a pouch assembly comprising a pouch and a collar releasably joined to the pouch, the pouch having a proximal end and an open distal end, a sidewall of the pouch being formed of a flexible material and bounding a food volume, a plurality of holes formed in the pouch sidewall to permit the passage of food therethrough, the pouch sidewall having an inner surface, a radially inwardly extending bead formed on the inner surface of the pouch sidewall to be adjacent the distal end of the pouch, the bead sized to be received in either the first groove or the second groove, the pouch sidewall comprising an outer surface, a radially outwardly extending circumferential pouch flange formed on the outer surface of the pouch sidewall near the distal end of the pouch, a collar groove formed on the inner sidewall of the collar and sized to receive the pouch flange;

wherein in a first configuration, the bead is disposed in the first groove, and wherein in order to place the infant feeder in a second configuration, a predetermined axial force is exerted on the collar relative to the handle, thereby dislodging the bead of the pouch from the first groove, axially sliding the bead in a distal direction along the circumferential sidewall portion of the tongue until the second groove is met and snapping the bead into the second groove, thereby decreasing the food volume.

14. The infant feeder of claim 13, wherein a radially inwardly extending circumferential pouch groove is formed in the outer surface of the pouch sidewall to be disposed proximally of the pouch flange, a radially inwardly extending collar flange formed on the inner sidewall of the collar to be disposed proximally of the collar groove and sized to be received in the pouch groove.

15. The infant feeder of claim 13, wherein the pouch is a first pouch, the handle, collar and first pouch being provided as part of a kit that further includes at least a second pouch, the second pouch differing from the first pouch by one or more of a number of the holes, a size of the holes, or a size of the food volume.

16. The infant feeder of claim 15, wherein the kit further includes a third pouch, the third pouch differing from the first and second pouches by one or more of the number of holes, the size of the holes, or size of the food volume.

17. The infant feeder of claim 13, further comprising a cap frictionally engaged with the pouch assembly to cover the pouch.

18. The infant feeder of claim 13, wherein the base has a proximal surface and the collar has a distal surface, the distal surface of the collar mating with the proximal surface of the base when the infant feeder is in the second configuration.

19. An infant feeder comprising:

a handle extending along a central axis, the handle comprising a base extending laterally from the handle and a tongue extending proximally from the base, a width of the tongue being less than both a width of the base and a width of the handle, the tongue comprising includes a first detent and a second detent axially spaced from each other the first detent and the second detent being defined above a horizontal plane corresponding to the base;

a pouch assembly removably coupled to the tongue and defining an internal food volume, the pouch assembly comprising:

a flexible pouch with a plurality of openings for dispensing food; and a mating detent configured to selectively engage the first or second detent of the tongue, such that when the pouch assembly is in a first position, the mating detent engages the first detent, and in response to an axial force, the pouch assembly transitions to a second position in which the mating detent engages the second detent.

20. The infant feeder of claim 19, wherein the pouch is formed from a unitary flexible material.

21. The infant feeder of claim 19, wherein the handle, the base, and the tongue are formed from a unitary structure.

22. The infant feeder of claim 19, wherein:

the first and second detents are grooves, and the mating detent is a bead on the inner surface of the pouch assembly.

23. The infant feeder of claim 1, wherein the dispensing openings are located in a proximal region of the pouch.

* * * * *